United States Patent [19]

Arjunan

[11] Patent Number: 5,397,837
[45] Date of Patent: Mar. 14, 1995

[54] COMPATIBILIZED BLENDS CONTAINING HALOGENATED COPOLYMERS OF ISOBUTYLENE AND PARA-METHYL STYRENE AND CARBOXY MODIFIED ELASTOMERS

[75] Inventor: Palanisamy Arjunan, Houston, Tex.

[73] Assignee: Exxon Chemical Patents Inc., Linden, N.J.

[21] Appl. No.: 64,318

[22] Filed: May 11, 1993

[51] Int. Cl.⁶ .............................................. C08L 51/04
[52] U.S. Cl. ..................................... 525/72; 525/74; 525/78; 525/209; 525/213; 525/221
[58] Field of Search ..................... 525/74, 72, 78, 209, 525/213, 221

[56] References Cited

U.S. PATENT DOCUMENTS

| | | | |
|---|---|---|---|
| 5,013,793 | 5/1991 | Wang et al. | 525/195 |
| 5,162,445 | 11/1992 | Powers et al. | 525/333.4 |
| 5,206,303 | 4/1993 | Tse et al. | 525/319 |
| 5,244,971 | 9/1993 | Jean-Marc | 525/64 |

Primary Examiner—James J. Seidleck
Assistant Examiner—M. L. Warzel
Attorney, Agent, or Firm—Catherine L. Bell; Myron B. Kurtzman

[57] ABSTRACT

A compatibilized polymer blend composition is provided which comprises a uniform admixture of a halogenated copolymer of an isomonoolefin, such as polyisobutylene, and a para-alkylstyrene, such as para-methylstyrene blended with a carboxy-modified elastomer. Blends also containing an unmodified elastomer are provided wherein the carboxy-modified elastomer serves to compatibilize the unmodified elastomer and the halogenated copolymer.

12 Claims, No Drawings

COMPATIBILIZED BLENDS CONTAINING HALOGENATED COPOLYMERS OF ISOBUTYLENE AND PARA-METHYL STYRENE AND CARBOXY MODIFIED ELASTOMERS

BACKGROUND OF THE INVENTION

1. Field of the Invention

The present invention relates to the use of carboxy-modified elastomers as a compatibilizing component in blends containing a halogenated copolymer of a $C_4$ to $C_7$ isomonoolefin and a para-alkylstyrene.

2. Description of Related Art

Halogenated copolymers of isobutylene and up to about 4 mole % of isoprene (butyl rubber) are well known polymer materials whose vulcanizates offer some outstanding properties not possessed by many other diolefin-based elastomers. Articles prepared from many cured halogenated elastomers offer improved resistance to oils and greases as well as resistance to oxygen and ozone degradation. Butyl rubber vulcanizates exhibit good abrasion resistance, excellent impermeability to air, water vapor and many organic solvents as well as resistance to aging and sunlight. These properties render these materials ideal candidates for one or more applications such as water hoses, organic fluid hoses, components in tire construction, gaskets, air springs, adhesive compositions and various molded articles.

More recently, a new class of halogenated elastomeric interpolymers have been discovered which offer many of the same properties as halogenated butyl rubber, but are even more ozone and solvent resistant and are more readily curable. These materials are the halogenation product of random copolymers of a $C_4$ to $C_7$ isoolefin, such as isobutylene, and a para-alkyl styrene comonomer, preferably containing at least about 80%, more preferably at least about 90% by weight of the para isomer, and wherein at least some of the alkyl substituent groups present in the styrene monomer units contain halogen. Preferred materials may be characterized as isobutylene interpolymers containing the following monomer units randomly spaced along the polymer chain:

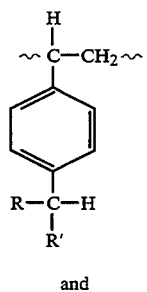

1.

and

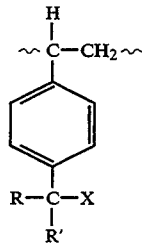

2.

wherein R and R' are independently hydrogen, lower alkyl, preferably $C_1$ to $C_4$ alkyl and X is bromine or chlorine, and wherein the interpolymer is otherwise substantially free of ring halogen or halogen in the polymer backbone chain. Preferably R and R' are each hydrogen. Up to about 60 mole % of the para-alkyl styrene present in the interpolymer structure may be the halogenated structure (2) above.

Most useful of such materials are elastomeric copolymers of isobutylene and para-methylstyrene containing from about 0.5 to about 20 mole % para-methyl styrene wherein up to about 60 mole % of the methyl substituent groups present on the aromatic ring contain a bromine or chlorine atom, preferably a bromine atom. These copolymers have a substantially homogeneous compositional distribution such that at least 95% by weight of the polymer has a para-alkylstyrene content within 10% of the average para-alkylstyrene content of the polymer. They are also characterized by a very narrow molecular weight distribution (Mw/Mn) of less than about 5, more preferably less than about 2.5, a preferred viscosity average molecular weight in the range of from about 300,000 up to about 2,000,000, and a preferred number average molecular weight in the range of from about 25,000 to about 500,000.

These copolymers may be prepared by slurry polymerization of the monomer mixture using a Lewis Acid catalyst, followed by halogenation, preferably bromination, in solution in the presence of halogen and a radical initiator such as heat and/or light and/or a chemical initiator.

Preferred brominated copolymers generally contain from about 0.1 to about 2 mole % of bromomethyl groups, most of which is monobromomethyl, with less than 0.05 mole % dibromomethyl substituents present in the copolymer. These copolymers, their method of preparation, their method of cure and graft or functionalized polymers derived therefrom are more particularly disclosed in U.S. Pat. No. 5,162,445, the complete disclosure of which is incorporated herein by reference.

The aromatic halomethyl groups present in such copolymers permit facile cross linking to be accomplished in a variety of ways, including by means of zinc oxide or promoted zinc oxide curing systems normally used to cure halogenated butyl rubber.

As stated above, the superior properties of vulcanizates based on halogenated isobutylene/para-methyl styrene copolymers (hereafter referred to as HI-PMS) render them eminently suitable in applications where good heat aging, weatherability, ozone resistance, impermeability to liquids, gases and vapors, energy absorption, flex cracking resistance and chemical resistance are important. Such applications include belts and hoses for water or organic fluids, gaskets, components in tire construction, adhesives, various molded articles, conveyor belts, air springs, and the like.

Yet another application suggested for HI-PMS is its use as a blend component with one or more dissimilar elastomers which lack one or more of these properties in order to enhance these properties in compositions containing such dissimilar elastomers and/or to impart one or more beneficial properties of the dissimilar elastomer into compositions containing HI-PMS.

For example, Neoprene (polychloroprene) rubber (CR) has been the material of choice in most power transmission belts, due to its unique combination of properties: oil resistance, toughness, dynamic flex life, good adhesion to other materials and heat resistance up to 100° C. In the past, CR belts have kept pace with the needs of the automotive industry, but recently there is a need for new materials for more demanding applications. First of all, CR belts are encountering greater heat duress in service due to increasing underhood temperatures (up to 150° C.). Secondly, to meet automotive industry's longer warranty periods ("100,000 mile target"), the CR belts must have a lower failure rate with high mean life, even when high temperatures are not encountered. To meet these emerging needs, improvements in heat, ozone, and cut growth resistance of Neoprene belts are desirable.

Nitrile rubber (NBR) is used in automobiles because of its resistance to fuels, a variety of oils and other fluids over a wide range of temperatures. However, nitrile rubber, as such, cannot be used in specific applications requiring heat and ozone resistance. The poor ozone resistance and heat ageing properties of NBR (which is a random copolymer of acrylonitrile and butadiene) are believed to be the result of unsaturation in the backbone of the polymer which permits scission of the polymer chain to occur under certain adverse conditions.

More highly unsaturated rubbers such as natural rubber, polyisoprene, polybutadiene and butadiene/styrene copolymer rubber may exhibit good properties in terms of wear resistance, flexibility, road adhesion and the like, but these materials are also subject to chemical attack and oxygen and ozone degradation, which may limit the useful lifetime of articles prepared from their vulcanizates such as tires, hoses, windshield wipers, gaskets and molded automotive components.

However, the use of butyl, halobutyl or HI-PMS rubber in blends with other elastomers is often limited to those other elastomers which have a mutual compatibility and comparable cure rate behavior with respect to the isobutylene rubber. Thus whereas highly unsaturated elastomers such as polybutadiene or polyisoprene may, in some cases, be reasonably compatible with isobutylene rubber and may be co-vulcanized because of the high availability of sites of ethylenic unsaturation, other elastomers such as polychloroprene, butadiene/acrylonitrile copolymers and like materials containing polar groups along the chain and/or a relatively low degree of ethylenic unsaturation are not so readily co-vulcanized. In the case of blends with these latter elastomers, chemical and ozone resistance may be improved due to the influence of the isobutylene rubber, but often at the expense of a lowering of physical properties such as tensile strength, elongation, modulus and/or abrasion resistance of the co-vulcanizate as compared with the cured elastomer itself.

Furthermore, many rubber compounds contain carbon black as a filler to increase strength, rigidity and other factors. Accordingly, a rubber blend must also be able to incorporate carbon black to be of use in the automotive industry. However, for blends of dissimilar elastomers, problems can arise in achieving optimum carbon black distribution between the microphases of the final product. In blends of elastomers that differ significantly in terms of unsaturation, polarity or viscosity, carbon black tends to locate preferentially in the higher unsaturation, more highly polar or lower viscosity phase.

The role of a compatibilizer in an elastomer blend is manifold: (1) reduce the interfacial energy between the phases, (2) permit a finer dispersion during mixing, (3) provide a measure of stability against gross segregation, and (4) result in improved interfacial adhesion (G. E. Molau, in "Block Copolymers", Ed by S. L. Agarwal, Plenum, New York, 1970, p. 79).

Two elastomers form a compatible mixture when they have at least one of the following characteristics:

Segmental structural identity. For example, a graft or block copolymer of butadiene and styrene is compatible with either polybutadiene or polystyrene.

Miscibility or partial miscibility with each other. Solubility parameter difference <1, generally <0.2 units. For example, poly (vinyl chloride), PVC, poly (ethylacrylate), PEA, poly (methylacrylate), PMA, have solubility parameters in the 9.4–9.5 range and form compatible mixtures. Although, the structure of nitrile rubber (NBR) is entirely different from those of PVC, PMA and PEA, it has a similar solubility parameter of 9.5 and is compatible with these three polymers.

Functional groups capable of generating covalent, ionic, donor-acceptor or hydrogen bonds between the polymers.

SUMMARY OF THE INVENTION

The present invention provides for compatibilized elastomer blend compositions based on a mixture of copolymer of a $C_4$ to $C_7$ isomonoolefin, such as isobutylene, copolymerized with a para-alkyl styrene comonomer, such as para-methyl styrene wherein at least some of the alkyl substituent groups present in the styrene monomer units contain halogen, and a carboxy-modified elastomer containing carboxy functionality. The invention also provides for ternary or higher blends containing an additional elastomer which is normally incompatible with the halogenated isomonoolefin/para-alkyl styrene copolymer but which is reasonably compatible with the carboxy modified elastomeric component of the blend.

The presence of the carboxy-modified compatibilizer component in the blends of this invention gives rise to compositions and vulcanizates having a good balance of physical and chemical properties and improved heat, ozone and oil resistance.

The blends of this invention may be readily compounded, shaped and covulcanized into articles such as drive belts, automotive hoses, gaskets, molded articles, air springs, and the like which not only exhibit improved heat, ozone and oil resistance but also have retained or enhanced physical properties such as abrasion resistance, modulus, elongation and tensile strength.

DETAILED DESCRIPTION OF THE PREFERRED EMBODIMENTS

The HI-PMS component of the present invention is the halogenation product of a random copolymer of a $C_4$ to $C_7$ isomonoolefin, such as isobutylene, and a para-alkylstyrene comonomer wherein at least some of the alkylstyrene conomer groups present in the styrene monomer units contain halogen. Preferred materials may be characterized as isobutylene interpolymers containing the following monomer units randomly spaced along the polymer chains:

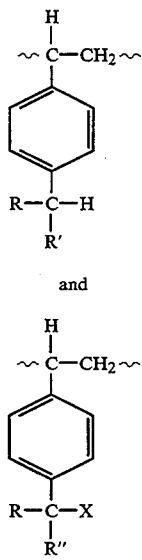

wherein R and R' are independently hydrogen or $C_1$ to $C_4$ alkyl, R" is independently hydrogen, $C_1$ to $C_4$ alkyl or halogen, and X is bromine or chlorine. In the preferred embodiment, interpolymer is substantially free of any halogen in the polymer backbone chain and at least about 5 mole % of the comonomer units present in the polymer chain are of the structure of formula 2.

With reference to isobutylene as the isoolefin comonomer, these interpolymers are inclusive of:

a) copolymers consisting of isobutylene and a monomer having the structure of formula 2 wherein R" is hydrogen or $C_1$ to $C_4$ alkyl, e.g., copolymers of isobutylene and a monohalo-substituted para-alkylstyrene;

b) terpolymers comprising isobutylene and a mixture of monomers having the structure of formulas 1 and 2 wherein R" is hydrogen or $C_1$ to $C_4$ alkyl, e.g., terpolymers of isobutylene, a para-alkylstyrene and a monohalo-substituted para-alkylstyrene;

c) terpolymers comprising isobutylene and a mixture of monomers having the structure of formula 2 wherein, with respect to a major proportion of the formula 2 monomer, R" is hydrogen or $C_1$ to $C_4$ alkyl and, with respect to a minor proportion of said formula 2 monomer, R" is X, e.g. bromine or chlorine, such as terpolymers of isobutylene, a mono-halo substituted para-alkylstyrene and a di-halo substituted para-alkylstyrene; and d) tetrapolymers comprising isobutylene and a mixture of monomers having the structure of formulas 1 and 2 wherein, with respect to major proportion of the formula 2 monomer, R" is hydrogen or $C_1$ to $C_4$ alkyl and, with respect to a minor proportion of said formula 2 monomer, R" is bromine or chlorine, e.g., tetrapolymers of isobutylene, a para-alkylstyrene, a monohalo-substituted para-alkyl styrene and a dihalo-substituted para-alkylstyrene.

As stated above, these halogenated interpolymers are prepared using a copolymer of a $C_4$ to $C_7$ isoolefin and a para-alkylstyrene as the halogenation substrate. Interpolymers having the composition (a), (b), (c) or (d) above will be produced as a function of the severity of the halogenation reaction. For example, mild halogenation will tend to yield interpolymers of the characteristics of (b), stronger halogenation will yield interpolymers of the characteristics of (a) or (d) and the strongest halogenation will yield terpolymers having the characteristics of (c).

The most preferred elastomers used in the compositions of the present invention are random elastomeric brominated terpolymers comprising isobutylene and para-methylstyrene comprising from about 0.5 to about 20 mole % PMS, more preferably from about 2 to about 15 mole % PMS, wherein up to about 60 mole % of the PMS monomer units contain a mono-bromomethyl group. These elastomeric copolymers generally exhibit a number average molecular weight in the range of from about 25,000 to about 500,000, more preferably from about 50,000 to about 250,000. From about 5 up to about 60 mole % of the total PMS monomer content of the terpolymer contains a mono-bromomethyl group with essentially no bromination occurring in the polymer backbone or in the aromatic ring. The bromine content of these terpolymers generally ranges from about 0.1 to about 5 mole %.

The elastomers whose carboxy-modified versions are useful as compatibilizers in compositions containing HI-PMS rubber include well known non-polar elastomers such as natural rubber, polyisoprene, polybutadiene, copolymers of butadiene with up to about 35 wt. % of styrene, ethylene/propylene rubber (EPR) and terpolymer rubber based on ethylene, propylene and up to about 10 wt. % of a non-conjugated diene such as 1,4-hexadiene, dicyclopentadiene or ethyl norbornene (EPDM). Also inclusive of these elastomers are polar elastomers which are not normally compatible with HI-PMS rubber due to the presence of a large number of polar groups along the polymer chain such as polychloroprene (CR rubber) and copolymers of butadiene with up to about 45 wt. % of acrylonitrile (nitrile rubber).

Carboxy-modified versions of the above elastomers may be prepared by one of several routes. One technique involves the inclusion of from about 0.1 to about 10 wt. % of a free radically polymerizable, ethylenically unsaturated acid monomer in the polymerization recipe and conducting the polymerization under controlled conditions to produce a copolymer or terpolymer containing the acid monomer randomly distributed along the polymer chain. Examples of such acids are acrylic or methacrylic acid, maleic acid, fumaric acid, itaconic acid and the like, and mixtures thereof. For example, carboxy-modified versions of polybutadiene, butadiene/styrene rubber, butadiene/acrylonitrile rubber or polychloroprene rubber may be prepared by including up to about 10 wt. % of acrylic acid or methacrylic acid in the polymerization recipe along with the monomer or mixture of monomers used to prepare these elastomers.

Yet another technique for preparing carboxy-modified elastomers involves the well known method of grafting an unsaturated acid monomer onto a preformed polymer backbone in the presence of a free radical initiator at grafting reaction conditions in a reaction zone, such as disclosed in U.S. Pat. No. 3,862,265. Thus, elastomers such as natural rubber, butyl rubber, Ziegler catalyzed polybutadiene or polyisoprene rubbers, EPR and EPDM rubbers can be modified by contacting a solution or melt of the polymer with from about 0.01 to about 1 mole (per mole of polymer) of an unsaturated organic acid or derivative thereof in the presence of a free radical initiator such as heat and/or light and/or a chemical initiator at temperatures ranging from about 25° to 300° C.

Suitable unsaturated organic acids include unsaturated carboxylic acids, unsaturated carboxylic acid derivatives and mixtures thereof. The carboxylic acid may be a mono or polycarboxylic acid, preferably having from 3 to 12 carbon atoms. By way of example, the unsaturated carboxylic acid may be maleic acid, fumaric acid, citraconic acid, mesaconic acid, itaconic acid, himic acid, acetylenedicarboxylic acid and mixtures thereof. The preferred carboxylic acid is maleic acid. The unsaturated carboxylic acid derivative may be a cyclic acid anhydride, an amide, an imide, an ester and mixtures thereof. Suitable cyclic acid anhydrides include maleic anhydride, citraconic anhydride, itaconic anhydride, and himic anhydride. The preferred anhydride is maleic anhydride.

Suitable free radical initiators include (1) thermally decomposable compounds which generate radicals such as azo compounds or organic peroxides; (2) compounds which generate free radicals by non-thermal methods such as photochemical or redox processes; (3) compounds which have inherent radical character such as molecular oxygen; or (4) electromagnetic radiation such as X-rays, electron beams, visible light and ultraviolet-light.

Suitable organic peroxide compounds include hydroperoxides, dialkyl peroxides, diacyl peroxides, peroxyesters, peroxydicarbonates, peroxyketals, ketone peroxides and organosulfonyl peroxides. Preferably, the free radical initiator is an organic peroxide compound having a half-life, at the reaction temperature, of less than one tenth of the reaction/residence time employed.

The grafting reaction may be conducted in the absence of a diluent or in the presence of a diluent. When a diluent is present in the reaction zone, suitable diluents include saturated aliphatic hydrocarbons, aromatic hydrocarbons, and perhalogenated hydrocarbons.

Preferably, the grafting reaction is conducted in the absence of a diluent and in the melt phase, wherein the elastomer is in the molten phase. The reaction temperature is chosen to be appropriate for the initiator used. Most preferably the reaction is conducted in an extruder by forming a mixture of the elastomer, grafting monomer and an organic peroxide and subjecting this mixture to shear mixing and extrusion conditions at temperatures in the order of 25° to 250° C.

In the most preferred embodiment of the invention, the carboxy-modified elastomers contain from about 0.5 to 0.001 millimoles of comonomer or grafting monomer per gram of modified polymer, more preferably from about 0.2 to about 0.002 millimoles.

The above described modification imparts carboxy functionality to the elastomer molecules which functionality can be neutralized to form a salt and thereafter reacted with the benzylic halogen present on the HI-PMS copolymer to form a graft polymer. These carboxy-modified elastomers include commercially available nitrile rubbers marketed by B. F. Goodrich under the trade name HYCAR 1072 and 1072CG having a Mooney Viscosity (ML-4, 212° C.) in the range of about 22 to 55, more preferably from 30 to 40. A preferred carboxy modified nitrile rubber is HYCAR 1072CG having an acrylonitrile content of about 30–35% by weight and a Mooney Viscosity of about 22 to 35.

The present invention also provides for compatibilized ternary or higher blends containing a mixture of HI-PMS elastomer, carboxy-modified elastomer and at least one additional elastomer which is compatible with the carboxy-modified elastomer. Examples of such elastomers are unmodified versions of the elastomers set forth above, but which are not carboxy modified, e.g., polybutadiene, copolymers of butadiene with styrene or acrylonitrile, butyl rubber, polychloroprene, EPR, EPDM rubber and the like. The additional elastomer may be the same or different from the elastomer used to prepare the carboxy-modified elastomer, and may include a mixture of such elastomers. In this embodiment, compatibilization of ternary or higher blends is afforded by the natural compatibility of the carboxy-modified elastomer and the additional elastomer as well as the chemical reaction between the carboxy-modified elastomer and the HI-PMS copolymer. Examples of such blends include: Nitrile rubber/carboxy modified nitrile rubber/HI-PMS; neoprene rubber/HI-PMS; neoprene/HI-PMS/isobutylene & para-alkyl styrene copolymer rubber; Polychloroprene/carboxy modified polychloroprene/HI-PMS; Polychloroprene/carboxy modified polychloroprene/HI-PMS/isobutylene and para-alkyl styrene copolymer rubber; Polybutdiene/carboxy modified polybutadiene/HI-PMS; EPDM/carboxy modified EPDM/HI-PMS; and like blends.

For binary blends, the carboxy-modified elastomer (CME) may be mixed with the HI-PMS elastomer in the range of from about 5 to 95 parts by weight CME and correspondingly from about 95 to 5 parts by weight of HI-PMS, more preferably from about 25 to 75 parts by weight of CME and 75 to 25 parts by weight of HI-PMS. With respect to ternary or higher blends also containing one or a mixture of unmodified elastomers, the composition preferably contains from about 30 to about 95% by weight of the unmodified elastomer(s) and the balance of the elastomer content is the blend of carboxy modified elastomer and HI-PMS elastomer in the respective ratios set forth above. In another embodiment the binary blends may further comprise an unmodified elastomer selected from the group consisting of butyl rubber, natural rubber, polyisoprene, polybutadiene, copolymers of butadiene with styrene, butyl rubber, ethylene/propylene copolymers, ethylene/propylene/non-conjugated diene terpolymers, polychloroprene, colpolymers of isobutylene and para-alkylstyrene and nitrile rubber.

While not wishing to be bound by any theory, it is believed that compatibilization of the carboxy-modified elastomer and HI-PMS elastomer is brought about by the formation of ester linkages as the result of an in-situ reaction during polymer processing between the carboxy functionality present in the carboxy-modified elastomer and benzylic halogen, e.g. bromine, present in the HI-PMS polymer molecules. This reaction is facilitated by forming a salt of the functional group of the carboxy-modified elastomer prior to or subsequent to mixing it with the HI-PMS elastomer. Suitable salt-forming cations include alkali or alkaline earth metals, zinc, cadmium, tin and the like, as well as ammonium or organo ammonium cations. Preferred salts are the organo, quarternary ammonium salts such as tetraalkyl ammonium, where ithhe alkyl contains up to 30 carbon atoms, e.g., tetrabutyl ammonium salt, and phosphonium salts.

The vulcanizable composition of the present invention may also include conventional mixed vulcanizing systems which are known curatives for the elastomers present in the blend. Generally such vulcanizing systems may include a metal oxide such as zinc oxide used either alone or mixed with one or more organic accelerators or supplemental curing agents such as an amine, a phenolic compound, a sulfonamide, thiazole, a thiuram compound, thiourea or sulfur. Organic peroxides may also be used as curing agents. The zinc oxide is normally present at a level of from about 1 to about 10 parts by weight per 100 parts by weight of elastomer blend, and the sulfur and supplemental curing agents or curing accelerators, where used, may be present at a level of from about 0.1 to about 5 parts by weight per 100 parts by weight of the elastomer blend.

The elastomer polymer composition may also contain other additives such as lubricants, oils, waxes, fillers, plasticizers, tackifiers, coloring agents, blowing agents and antioxidants.

Examples of fillers include inorganic fillers such as carbon black, silica, calcium carbonate, talc and clay, and organic fillers such as high-styrene resin, coumarone-indene resin, phenolic resin, lignin, modified melamine resins and petroleum resins. The preferred filler is carbon black present at a level of from about 3 to 50 parts by weight per hundred parts by weight of total elastomer content of the blend, more preferably from about 20 to 40 parts by weight.

Examples of lubricants include petroleum-type lubricants such as oils, paraffins, and liquid paraffins, coal tar-type lubricants such as coal tar and coal tar pitch; fatty oil-type lubricants such as beeswax, carnbaua wax and lanolin; fatty acids and fatty acid salts such as licinoleic acid, palmitic acid, barium stearate, calcium stearate and zinc laurate; and synthetic polymeric substances such as petroleum resins.

Examples of plasticizers include hydrocarbon oils, e.g., paraffin, aromatic and napththenic oils, phthalic acid esters, adipic acid esters, sebacic acid esters and phosphoric acid-type plasticizers.

Examples of tackifiers are petroleum resins, coumarone-indene resins, terpene-phenol resins, and xylene/-formaldehyde resins.

Examples of coloring agents are inorganic and organic pigments.

Examples of blowing agents are sodium bicarbonate, ammonium carbonate, N,N'-dinitrosopentamethylenetetramine, azocarbonamide, azobisisobutyronitrile, benzenesulfonyl hydrazide, toluenesulfonyl hydrazide, calcium amide, p-toluenesulfonyl azide, salicylic acid, phthalic acid and urea.

The vulcanizable composition may be prepared and blended on any suitable mixing device such as an internal mixer (Brabender Plasticorder), a Banbury Mixer, a kneader, an extruder or a similar mixing device. Blending temperatures and times may range from about 45° to 180° C. and 4 to 10 minutes respectively. After forming a homogeneous mixture of the elastomers and optional fillers, processing aids, antioxidants and the like, the mixture is then vulcanized by the further mixing-in of crosslinking agents and accelerators followed by heating the resulting blend to a temperature of from about 100° to 250° C., more preferably from about 125° to 200° C., for a period of time ranging from about 1 to 60 minutes. Molded articles such as belts and hoses are prepared by shaping the prevulcanized formulation using an extruder or a mold, and subjecting the composition to temperatures and curing times as set forth above.

The following examples are illustrative of the invention.

EXAMPLE 1

This example illustrates the preparation of compatibilized blends containing an unmodified nitrile rubber, a carboxy nitrile rubber and a brominated copolymer of isobutylene and para-methyl styrene.

The elastomers used in the formulations were as follows:

NBR-COOH is a copolymer of butadiene containing about 33 wt. % of acrylonitrile and about 6 wt. % of acrylic acid having a Mooney Viscosity of (ML-4, 212° F.) 22-35 (HYCAR__ 1072CG).

NBR is an unmodified copolymer of butadiene containing about 26 wt. % acrylonitrile having a Mooney Viscosity of (ML-4, 212° F.) 65-80 (Paracril B-Uniroyal).

BrI-PMS is a brominated copolymer of isobutylene containing 5 wt. % of para-methylstyrene having a Mooney Viscosity ML(1+8) 125° C. of 53 and a bromine content of 0.8 wt. %.

(a) Preparation of Tetrabutylammonium Salt of Carboxy-modified Nitrile Rubber

NBR-COOH was dissolved in tetrahydrofuran solvent to form a 5 wt. % cement solution, to which was added several drops of phenolphthalein solution. Tetra-n-butyl ammonium hydroxide was dissolved in methanol to form a 1 molar solution, which was then used to titrate the resulting cement to neutrality as evidenced by a color change from pale yellow to deep amber yellow. This solution was then transferred to an evaporation tray and the solvent was evaporated to dryness.

(b) Preparation of Polymer Blends

Blends having the composition shown in Table 1 (parts by weight) were prepared by mixing the components in a small scale (60 cc) Brabender mixer at a temperature of 110° C. for a period of 5 minutes. These blends were then examined in an optical microscope as thin sections (100–200 nm) using phase contrast such that the NBR/NBR-COOH phase appeared black and the BrI-PMS phase appeared a greyish-white.

TABLE 1

| | BLEND | | |
|---|---|---|---|
| COMPONENT | A | B | C |
| NBR | 70 | — | 60 |
| BrI-PMS | 30 | 30 | 30 |
| NBR-COOH salt | — | 70 | 10 |

Microscopic examination showed that, with respect to blends B and C, the BrI-PMS phase was much more finely and uniformly dispersed in the nitrile rubber phase as compared with blend A which did not contain the tetrabutylammonium salt of NBR-COOH as a compatibilizer. The particle size of the dispersed phase in blends B and C was in the order of 1–2 microns, whereas most of the BrI-PMS phase in blend A appeared as poorly dispersed, long fibrils or islands having a dimension in excess of 10 microns.

(c) Preparation of Vulcanizates

The blends prepared in part (b) were formated into vulcanizable compositions. The curing recipe employed was as follows:

| | |
|---|---|
| Elastomer | 45 g (100 phr) |
| Stearic Acid | 0.225 g (0.5 phr) |
| Octamine | 0.45 g (1.0 phr) |
| WINGSTAY 29 Disp[1] | 0.32 g (0.715 phr) |
| WINGSTAY 100 Az[2] | 0.565 g (1.25 phr) |

| | -continued | |
|---|---|---|
| ARANOX | 0.225 g | (0.5 phr) |
| ZnO | 1.125 g | (2.5 phr) |
| MBTS[4] | 0.90 g | (2.0 phr) |
| TMTDS[5] | 0.675 g | (1.5 phr) |

Notes:
[1] styrenated diphenylamine
[2] mixed diaryl-p-phenylenediamine (Good Year)
[3] p-(polysulfonylamido) diphenylamine (Uniroyal)
[4] 2,2'-dibenzothiazyl disulfide
[5] tetramethyl thiuram disulfide Curable compositions were prepared by first mixing stearic acid and octamine with the polymers in a small scale (60 cc) Brabender at 140° C., 60 rpm for 5 min. The blend samples were removed, cooled under nitrogen and the rest of the ingredients were mixed at 50° C., 50 rpm for 5 min. The blend samples were then cured at 160° C. for 20 minutes to fabricate test specimens (tensile dumbbells, etc.) which were tested after a 24 hour waiting period. Mechanical properties, heat aging, and dynamic ozone resistance were measured using standard (ASTM) conditions.

Physical and mechanical property data for the cured blends are shown in Table 2.

TABLE 2
VULCANIZATE BLEND

| | A | B | C |
|---|---|---|---|
| NBR | 70 | — | 60 |
| BrI-PMS | 30 | 30 | 30 |
| NBR-COOH salt | — | 70 | 10 |
| Physical Properties | | | |
| Cure 20 min. 160° C.[1] | | | |
| Tensile MPA | 11.9 | 9.5 | 9.0 |
| Elongation % | 1037 | 727 | 1093 |
| Heat Aged 96 Hr. 140° C.[2] | | | |
| Tensile | 4.8 | 4.9 | 6.0 |
| Elongation % | 292 | 258 | 426 |
| Dynamic Ozone Resistance[3] | | | |
| 100 ppm O₃ 37.8° C. 30 Cycle/Min. | | | |
| Hr. to Crack | 120 | >148 | >336 |

Note
[1] ASTM D-3182-89
[2] ASTM D-573
[3] ASTM D-3395-86 (METHOD A)

The improved compatibility of these blends is demonstrated by significant improvements in the heat and zone resistance shown with respect to blends B and C when compared with blend A which did not contain the compatibilizer component.

I claim:

1. A compatibilized elastomer blend composition comprising a uniform admixture of:
   (i) a halogenated interpolymer of a $C_4$ to $C_7$ isomonoolefin copolymerized with a para-alkylstyrene, said copolymer containing from about 0.5 to about 20 mole % of monomer units of the following structure randomly distributed therein:

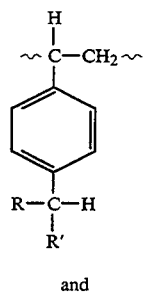

and

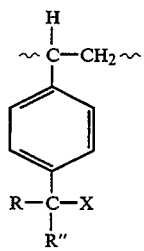

wherein R and R' are independently selected from the group consisting of hydrogen and lower alkyl, R" is independently selected from the group consisting of hydrogen, lower alkyl and halogen, and X is bromine or chlorine; and
   (ii) a carboxy-modified elastomer.

2. The composition of claim 1 wherein said halogenated interpolymer is a terpolymer of isobutylene, paramethystyrene and monobromo-paramethyl styrene.

3. The composition of claim 2 wherein from about 5 to about 60 mole % of the para methyl styrene monomer units contain a mono-bromomethyl group.

4. The composition of claim 2 wherein said terpolymer has a bromine content in the range of from about 0.1 to about 5 mole %.

5. The composition of claim 1 wherein the elastomer of said carboxy-modified elastomer is selected from the group consisting of natural rubber, polyisoprene, polybutadiene, copolymers of butadiene with styrene, ethylene/propylene copolymers, ethylene/propylene/-non-conjugated diene terpolymers, polychloroprene and nitrile rubber.

6. The composition of claim 5 wherein said carboxy-modified elastomer is a salt.

7. The composition of claim 6 wherein said salt is a quaternary ammonium salt or a phosphonium salt.

8. The composiiton of claim 7 wherein said salt is a tetra-alkyl ammonium salt.

9. The composition of claim 1 wherein components (i) and (ii) are present in the range of from about 5 to 95% by weight of (i) and correspondingly from about 95 to 5% by weight of (ii), based on the elastomer content of the blend.

10. The composition of claim 5 wherein said carboxy-modified elastomer is a copolymer of butadiene and acrylonitrile containing from about 0.1 to about 10% by weight of copolymerized acrylic or methacrylic acid.

11. The composition of claim 1 further containing a vulcanization system.

12. A vulcanizate prepared by curing the composition of claim 11.

* * * * *